H. H. EVARTS.
FRICTION-JOINTS FOR SCHOOL-DESKS.
No. 172,007. Patented Jan. 11, 1876.
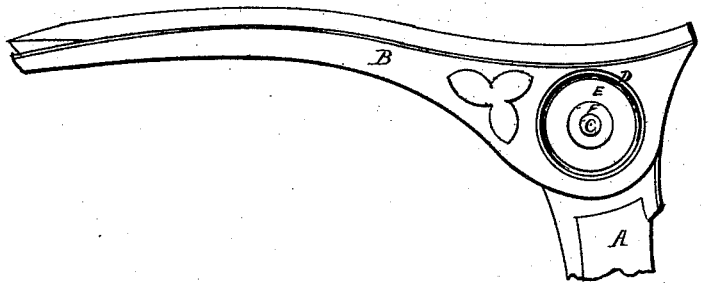
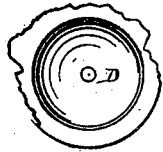
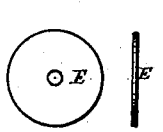
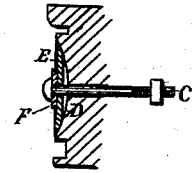
Witnesses:
W. A. Wheeldon
A. N. Andrews
Inventor:
Harry H. Evarts
by Munday & Evarts
his Attys.

UNITED STATES PATENT OFFICE.

HARRY H. EVARTS, OF CHICAGO, ILLINOIS.

IMPROVEMENT IN FRICTION-JOINTS FOR SCHOOL-DESKS.

Specification forming part of Letters Patent No. 172,007, dated January 11, 1876; application filed June 25, 1875.

*To all whom it may concern:*

Be it known that I, HARRY H. EVARTS, of Chicago, in the county of Cook and State of Illinois, have invented a certain Improvement in Friction-Joints for School-Seats; and I do hereby declare that the following is a full, clear, and exact description of the same, which, taken in connection with the accompanying drawing, forming a part of this specification, will be sufficient to enable any one skilled in the art to make and use the invention.

The drawing shows, at Figure 1, a side view of the hinge-joint between the seat-arm and the seat-standard, to which my improvement has been applied; at Fig. 2, a partial central vertical section of the hinge-joint; at Fig. 3, a front and edge view of the disk employed to produce the friction; and at Fig. 4, a front view of the dish-shaped cavity in the seat-arm, all of which will be more fully understood from what is hereunder written.

Like letters indicate like parts in all the figures.

In the drawing, A represents the seat-standard, and B the seat-arm, hinged together by any of the ordinary forms of trunnions or pivot-joints. C is the bolt which serves to lock the parts together, instead of which a rivet may be used, if preferred. Upon one side of the seat-arm is formed a dish-shaped cavity, D, concentric to the axis of the joint, and surrounding the bolt C. Within this cavity I place a flat steel disk, E, which is pierced at the center for the bolt, and which, by the tightening of the bolt, is brought against the surface of the cavity, toward the periphery thereof, and thereby is produced the friction desired.

To secure a more uniform working of the joint a washer, F, of less diameter than the disk, may be applied between the latter and the nut or head of the bolt.

Among the advantages attending this way of producing friction are the following: extreme simplicity and cheapness, great durability, and the ease with which the bolt may be tightened, and the joint rendered as firm as when new.

It is the almost universal practice of manufacturers of school desks and seats at the present time to make the joints of castings put together without previous turning or fitting, and, consequently, any imperfection in the casting must inhere in the joint, and render it uneven in movement. It will be found that my improvement compensates in great measure for these defects, and causes the joint to be of uniform stiffness throughout its range of motion.

I am aware that rubber has been employed to produce friction in these joints, but a fatal objection to its use is its destructibility. I am also aware that friction has been obtained by pressure exerted upon disked steel washers resting upon flat surfaces; but my improvement possesses very decided advantages over that method for various reasons. The dished washer must be tempered and stamped into shape, while the disk used by me requires neither tempering nor shaping, and the cavity can be cast into the metal of the arm without any expense additional to that required in producing a flat surface.

Having thus fully described my invention, what I claim as new, and desire to secure by Letters Patent, is—

The hinge or joint for school-seats, consisting of a seat arm and standard, one of which is provided with the concave depression D, the flat steel disk E, placed within the cavity, and the bolt which locks the parts together, substantially as and for the purposes set forth.

HARRY H. EVARTS.

Witnesses:
EDW. S. EVARTS,
LAURA E. EVARTS.